Nov. 22, 1938.     H. KOPPERS     2,137,722
DISTILLING APPARATUS FOR HIGH BOILING LIQUIDS, SUCH AS COAL TAR
Filed Jan. 6, 1936
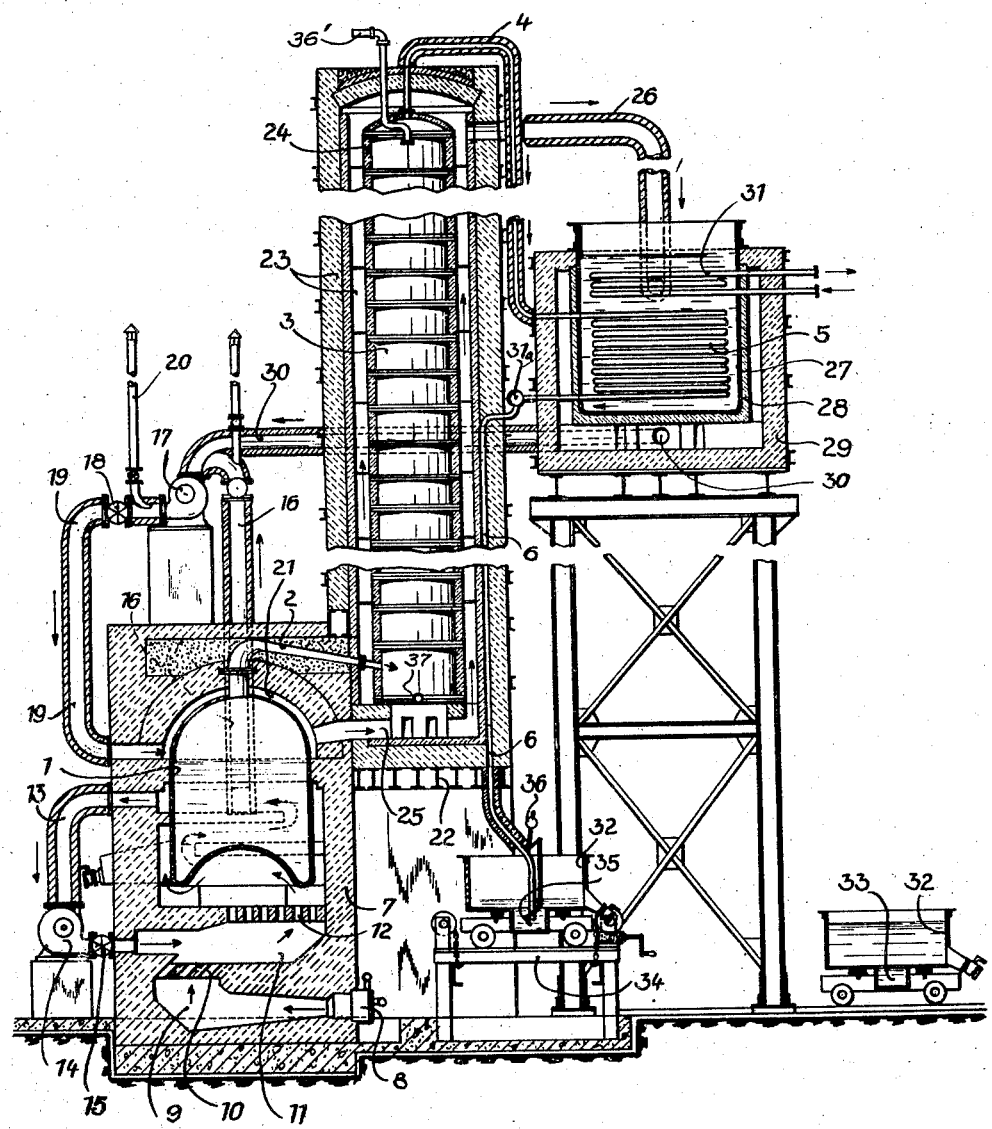
Inventor:
Heinrich Koppers Patented Nov. 22, 1938

2,137,722

UNITED STATES PATENT OFFICE 2,137,722

DISTILLING APPARATUS FOR HIGH-BOILING LIQUIDS, SUCH AS COAL TAR

Heinrich Koppers, Essen, Germany, assignor, by mesne assignments, to Koppers Company, Pittsburgh, Pa., a corporation of Delaware Application January 6, 1936, Serial No. 57,817
In Germany January 4, 1935

7 Claims. (Cl. 196—114)

The present invention relates to an apparatus for distilling at a decreased pressure, liquids containing high-boiling constituents of a high melting point, such as high-boiling constituents of coal tar or the like by making use of the distilling apparatus, comprising an evaporator, a fractionating column connected behind and a cooler.

The object of my present invention is to provide such improvements that the advantages of the fractionating distillation which make use of a multiple-stage fractionating column, can be adopted also to those media which contain, similar to coal tar, very high boiling constituents of a high melting point.

The principal feature of my invention is a distilling apparatus wherein the outside of the metal body of the fractionating column is covered with heat insulating material and arranged in a shaft-like heating chamber, which is fitted with means for heating up the space between the insulating cover of the fractionating column and the outer wall of the chamber.

A further improvement of my invention which is of great importance is that the heating chamber of the column is connected to the firing of the distilling still in such a way that the hot gases of the still firing can be led through the heating chamber of the column in regulatable quantities.

Another object of my invention is to provide improvements concerning the heating system of the still and the cooler for condensing the vapors driven off.

Further objects of my present invention may be taken from the following description of a preferred embodiment of my invention, according to the accompanying drawing in which there is shown an apparatus designed according to my invention and adapted for the distillation of tar or the like.

The drawing shows a usual still 1 to receive the tar to be subjected to the distillation process. Said still is connected by pipe 2 with a fractionating column 3 divided as usual by a large number of horizontal partitions in several compartments. In these compartments, the vapors introduced first into the lowest column compartment and then rising upwards through all the other compartments one after the other, are brought into contact with a liquid consisting of suitable condensates from the cooler. Said liquid may be introduced at the top of the column by a pipeline shown at 36', on the drawing and withdrawn from the bottom of the fractionating column at 37 separately from the still 1 or cooler 5. The pipeline 4 leads the unabsorbed vapors from the upper part of the fractionating column to a cooler 5, which is equipped with cooling coils from which the condensate is discharged through pipeline 6.

The still 1 is built in furnace of a suitable refractory brickwork 7. It is heated by a burner 8 from which the hot gases pass through a channel 9 and over a grate 10 into a circulating channel 11 of a primary heating flue system for the lower part of the still. The circulating channel 11 is connected by the grate 12 to the space underneath the still 1. The hot gases are led by continuations of the channel 11 formed by horizontal projections as shown by dotted lines on the drawing, in a zig-zag way, marked by dotted arrows around the lower part of the still 1 which is filled with the liquid to be distilled. The gases then flow through the pipeline 13 to a circulating fan 14 from which they are forced through the pipeline 15 being governed by a throttle valve back into the lower circulating channel 11. This special kind of primary heating the still ensures that the still is uniformly heated. Any local superheating and the formation of coke in the still which may be very dangerous, are thus avoided.

A pipeline 16 lined with insulating materials which leads hot gas from the circulating channel 11 of the primary heating flue system to the circulating fan 17, by means of which the hot gases can be forced into the pipeline 19, which is governed by a regulating device 18. A waste gas outlet 20 is connected in front of the regulating device 18. The gases which cannot enter the pipeline 19 are allowed to escape through said outlet.

The pipeline 19 leads to the heating chamber 21, surrounding the top of the still 1. The hot gases from the primary heating flue system thus again are introduced to the still at its upper part in such a quantity, that any dangerous superheating of the distilling vapors in the upper part of the still is eliminated.

A shaft-like chamber 23 being of the cylindrical type and built on supports 22 is arranged near the brickwork 7 in which is fitted the distilling still. A fractionating column 3 is housed in this chamber. The metal body of the fractionating column is covered by a heat insulating brickwork 24. A ring-shaped space is provided between the brickwork 24, and the outer wall of the heating chamber 23. The hot gases are then introduced into this space through the pipeline 25 from the space surrounding the upper part of the still 1. The hot gases rise into the ring-shaped space of heating chamber 23. Actually, they do not serve to heat the fractionating column but only to maintain the temperature of the fractionating column at the desired degree. Should it be wishful to keep a different temperature of the fractionating column at various heights, the insulating brickwork 24 may be of any thickness or means may be provided for, in order to heat the ring-shaped space of the heating chamber 23 at will. In other words, it is possible to arrange several feeding pipes instead of the gas delivery pipe 25. Said feeding pipes may run into the furnace at a different height and are separately governed by regulating valves or the like.

The hot waste gases are driven off at the upper end of the heating chamber 23 through the pipeline 26, which is equipped with a heat insulation and this pipeline leads to the cooler 5. The pipe coils of the cooler 5 have been arranged in a vessel 27, which is filled with high-boiling liquids, for instance with anthracene oil. The outside of the vessel 27 is covered with a heat insulation 28, and the vessel is built preferably of refractory brickwork 29. The pipe 26 leads into the space between the brickwork 29 and the insulation 28 so that hot gases may be introduced into the space surrounding the cooler. On the other hand, this space is connected to the circulating fan 17 by the pipeline 30. The hot waste gases of the still firing are thus circulated, by the fan 17 between the upper part of the still of the fractionating column and the cooler. If possible, means can also be provided for, in the circulation flow, for increasing or reducing the temperature at individual points.

Furthermore, several cooling coils 31 have been arranged in the vessel 27 of the cooler 5, near to the bath surface. A cooling liquid can be circulated through the coils for reducing the temperature of the liquid in the vessel 27.

As mentioned above, the condensate formed in the coils of cooler 5 is discharged through the pipeline 6. The pipeline 6 is of such an extension, that the height of the liquid column in the pipeline is in accordance with the vacuum to be maintained in the distilling apparatus. Thus it is possible to allow the condensate to flow off into a tank connected with the atmosphere and arranged at the lower end of the pipeline 6.

Furthermore, there is connected to the pipeline 6 a pipeline 31a, leading to the vacuum pump not shown on the drawing.

For receiving the condensate there are arranged travelling tanks 32 being provided with a cylindrical bottom extension 33, which is always filled with liquid. As may be seen from the drawing, the tank 32 which must be filled will be travelled upon an elevator platform 34. It is lifted to such a height, that the lower end of the pipe 6 dips into the bottom extension 33. The sealing valve 35 fitted at the lower end of the pipe 6 is then opened, by means of the adjusting lever 36, thereupon the condensate can flow into the tank 32. As soon as the tank 32 is filled, the valve 35 is closed and the tank filled up is to be removed and an empty tank has to take its place. In order to be able to collect the condensate during the changing of the tanks, it is advisable to provide in the pipe 6 a suitable extension or the like. The sealing valve 35 can also be replaced by a tapered plug, for closing the pipe 6. Should the pipe 6 not be arranged in the heated brickwork 23, as shown on the drawing, it is advisable to equip same with a suitable heat insulation.

The above invention, as hereinbefore set forth, is embodied in a particular form or construction but may be variously embodied within the scope of the claims hereinafter made.

I claim:—

1. Apparatus for distilling liquid containing high boiling constituents comprising: tar-still-means for distillation of high boiling liquid during heating of the tar-still-means; heating-means for heating the still by furnace-gases; a cooler-condenser having means for heating the same for controlled condensation therein; dephlegmating column-apparatus communicating at its lower part with a vapor outlet from the still to receive vapors of distillation therefrom and communicating at its upper part with condensing coils in the cooler-condenser for flow of unabsorbed vapors thereto; said dephlegmating column-apparatus being provided with means for receiving reflux medium at its upper part and with means for discharging at least a part of the same at its lower part separately from the still and cooler-condenser, and being disposed within and insulated from a shaft-like furnace, and means for heating the shaft-like furnace for controlled heating of the insulation of the dephlegmating column-apparatus.

2. Apparatus for distilling liquid containing high boiling constituents comprising: vat tar-still-means for distillation of high boiling liquid during heating of the tar-still-means; a heating system for heating the still by furnace-gases; a cooler-condenser having means for heating the same for controlled condensation therein; dephlegmating column-apparatus communicating at its lower part with a vapor outlet from the still to receive vapors of distillates therefrom and communicating at its upper part with the cooler-condenser for flow of unabsorbed vapors thereto; said dephlegmating column-apparatus being provided with means for receiving reflux medium at its upper part and with means for discharging at least a part of the same at its lower part separately from the still and cooler-condenser, and being disposed within and insulated from a shaft-like furnace communicating with a furnace-gas outlet of the heating flue system for the still for controlled indirect heating of the insulation of the dephlegmating column-apparatus by the outflowing furnace gases from the still.

3. Apparatus for distilling liquid containing high boiling constituents comprising: tar-still-means for distillation of high boiling liquid during heating of the tar-still means; heating-means for heating the still by furnace-gases; a cooler-condenser having means for heating the same for controlled condensation therein and provided with a submersed pipe coil system; dephlegmating column-apparatus communicating at its lower part with a vapor outlet from the still to receive vapors of distillation therefrom and communicating at its upper part with the pipe coil system of the cooler-condenser for flow of unabsorbed vapors thereto; said dephlegmating column-apparatus being provided with means for receiving reflux medium at its upper part and with means for discharging at least a part of the same at its lower part separately from the still and cooler-condenser, and being disposed within and heat insulated from a shaft-like furnace, means for supplying furnace-gas to the shaft-like furnace; and said cooler-condenser comprising a hot bath receptacle for the pipe coil system surrounded by heat insulation therefor.

4. Apparatus for distilling liquid containing high boiling constituents comprising: tar-still means for distillation of high boiling liquid during heating of the tar-still-means; heating-means for heating the still by furnace-gases; a cooler-condenser provided with a pipe coil system; dephlegmating column-apparatus communicating at its lower part with a vapor outlet from the still to receive vapors of distillation therefrom and communicating at its upper part with the pipe coil system of the cooler-condenser for flow of unabsorbed vapors thereto; said dephlegmating column-apparatus being provided with means for receiving reflux medium at its upper part and with means for discharging at least a part of the same at its lower part separately from the still and cooler-condenser, and being disposed within and heat insulated from a shaft-like furnace; means for supplying furnace-gas to the shaft-like furnace; said cooler-condenser comprising a hot bath receptacle for the pipe coil system surrounded by heat insulation therefor; a hot bath heating flue system surrounding the insulation of the hot bath receptacle and means for heating the hot bath heating system by burner gases.

5. Apparatus for distilling liquid containing high boiling constituents comprising: vat still-means for heating of the liquid during distillation; lower and separately controlled upper heating flue systems for separately controlled heating of the upper and lower parts of the still by burner gases; a cooler-condenser; dephlegmating column-apparatus communicating at its lower part with a vapor outlet from the still to receive vapors of distillation therefrom and communicating at its upper part with condensing coils in the cooler-condenser; said dephlegmating column apparatus being provided with means for receiving reflux medium at its upper part and with means for discharging at least part of the same separately from the still and cooler-condenser at its lower part, and being also disposed within and heat insulated from a shaft furnace communicating with a furnace gas outlet from the upper heating flue system for controlled indirect heating of the insulation of the dephlegmating column apparatus by the outflowing burner gases; and said cooler-condenser comprising a hot bath receptacle for submergence of the condenser-coils, surrounding heating flues communicating with an outlet for spent burner gases from said shaft furnace and with said upper heating flue system for the still for flow of spent furnace gases from the shaft furnace through the cooler-condenser heating flues and thence back to the upper heating flue system.

6. Apparatus for distilling liquid containing high boiling constituents comprising: vat still-means for heating of the liquid during distillation; a furnace comprising primary and separately controlled secondary heating-flue systems adapted for primary heating of the lower part of the vat still by recirculation of spent gases from an exit to the entrance of the primary heating flue system and for secondary heating of the upper part of the still by spent burner gases; conduit means outside the furnace for withdrawing part of the spent burner gases from the primary heating-flue system and introducing them into the secondary heating-flue system; vent means for said conduit means; a cooler-condenser, dephlegmating column apparatus communicating at its lower part with a vapor outlet from the still to receive vapors of distillation therefrom and communicating at its upper part with condensing coils in the cooler-condenser; said dephlegmating column apparatus being provided with means for receiving reflux medium at its upper part and with means for discharging at least part of the same separately from the still and cooler-condenser at its lower part, and being also disposed within and heat insulated from a shaft furnace communicating with a burner gas outlet from the secondary heating-flue system for controlled indirect heating of the insulation of the dephlegmating column apparatus by the outflowing burner gases; and said cooler-condenser comprising a hot bath receptacle for submergence of the condenser-coils, cooling means within said hot bath, surrounding heating flues communicating with an outlet for spent burner gases from said shaft furnace and with said conduit means outside the still for flow of spent burner gases from the shaft furnace through the cooler-condenser heating flues and thence back to the secondary heating-flue system, and said condenser coils terminating in a barometric condensate leg sealing means.

7. Apparatus for distilling liquid containing high boiling constituents comprising: vat still-means for heating of the liquid during distillation; a furnace comprising primary and separately controlled secondary heating-flue systems adapted for primary heating of the lower part of the vat still by recirculation of spent gases from an exit to the entrance of the primary heating-flue system and for secondary heating of the upper part of the still by spent burner gases; conduit means outside the furnace for withdrawing part of the spent burner gases from the primary heating-flue system and introducing them into the secondary heating-flue system; vent means for said conduit means; a cooler-condenser; dephlegmating column apparatus communicating at its lower part with a vapor outlet from the still to receive vapors of distillation therefrom and communicating at its upper part with condensing coils in the cooler-condenser; said dephlegmating column apparatus being provided with means for receiving reflux medium at its upper part and with means for discharging at least part of the same separately from the still and cooler-condenser at its lower part, and being also disposed within and heat insulated from a shaft furnace communicating with a burner gas outlet from the secondary heating-flue system for controlled indirect heating of the insulation of the dephlegmating column apparatus by the outflowing burner gases; and said cooler condenser comprising a hot bath receptacle for submergence of the condenser-coils, cooling means within said hot bath, surrounding heating flues communicating with an outlet for spent burner gases from said shaft furnace and with said conduit means outside the still for flow of spent burner gases from the shaft furnace through the cooler-condenser heating flues and thence back to the secondary heating-flue system.

HEINRICH KOPPERS.